(12) United States Patent
Kim et al.

(10) Patent No.: US 11,495,796 B2
(45) Date of Patent: Nov. 8, 2022

(54) POSITIVE ACTIVE MATERIAL FOR RECHARGEABLE LITHIUM BATTERY, METHOD OF PREPARING THE SAME AND RECHARGEABLE LITHIUM BATTERY INCLUDING THE SAME

(71) Applicant: Samsung SDI Co., Ltd., Yongin-si (KR)

(72) Inventors: Jongmin Kim, Yongin-si (KR); Donghyun Kil, Yongin-si (KR); Wooyoung Yang, Yongin-si (KR); Seung Joon Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 109 days.

(21) Appl. No.: 16/682,907

(22) Filed: Nov. 13, 2019

(65) Prior Publication Data

US 2020/0152981 A1 May 14, 2020

(30) Foreign Application Priority Data

Nov. 14, 2018 (KR) .......................... 10-2018-0140150

(51) Int. Cl.
*H01M 4/525* (2010.01)
*H01M 4/505* (2010.01)
(Continued)

(52) U.S. Cl.
CPC .......... *H01M 4/525* (2013.01); *H01M 4/505* (2013.01); *H01M 10/0525* (2013.01); *H01M 2004/027* (2013.01); *H01M 2004/028* (2013.01)

(58) Field of Classification Search
CPC ............ C01G 45/1228; C01G 45/1242; C01G 45/1257; C01G 45/1292; C01G 53/00;
(Continued)

(56) References Cited

U.S. PATENT DOCUMENTS

2006/0051671 A1 3/2006 Thackeray et al.
2008/0311473 A1 12/2008 Sasaoka et al.
(Continued)

FOREIGN PATENT DOCUMENTS

CN 101080830 A 11/2007
CN 103606674 A 2/2014
(Continued)

OTHER PUBLICATIONS

Office Action dated Oct. 26, 2020, of the corresponding Japanese Patent Application No. 2019-206253 (5 pages).
(Continued)

*Primary Examiner* — Carlos Barcena
(74) *Attorney, Agent, or Firm* — Lewis Roca Rothgerber Christie LLP

(57) ABSTRACT

A positive active material for a rechargeable lithium battery includes a lithium nickel-based composite oxide including a secondary particle in which a plurality of plate-shaped primary particles are agglomerated; and a lithium manganese composite oxide having at least two crystal lattice structures, wherein the secondary particle has a regular array structure in which (003) planes of the primary particles are oriented in a vertical direction with respect to the surface of the secondary particle.

15 Claims, 9 Drawing Sheets

(51) Int. Cl.
*H01M 10/0525* (2010.01)
*H01M 4/02* (2006.01)

(58) Field of Classification Search
CPC ...... C01G 53/006; C01G 53/42; C01G 53/50;
C01P 2002/54; C01P 2002/85; C01P
2004/03; C01P 2004/04; C01P 2004/20;
C01P 2004/50; C01P 2004/51; C01P
2004/61; C01P 2006/12; C01P 2006/40;
C01P 2006/80; H01M 10/0525; H01M
2004/027; H01M 2004/028; H01M
4/0471; H01M 4/1391; H01M 4/366;
H01M 4/505; H01M 4/525
See application file for complete search history.

(56) References Cited

U.S. PATENT DOCUMENTS

| | | | |
|---|---|---|---|
| 2010/0167078 | A1 | 7/2010 | Kim et al. |
| 2011/0311869 | A1 | 12/2011 | Oh et al. |
| 2012/0112139 | A1 | 5/2012 | Chang et al. |
| 2012/0261610 | A1 | 10/2012 | Paulsen et al. |
| 2012/0282522 | A1 | 11/2012 | Axelbaum et al. |
| 2012/0292561 | A1 | 11/2012 | Sasaoka et al. |
| 2014/0038052 | A1 | 2/2014 | Song et al. |
| 2014/0057175 | A1 | 2/2014 | Chung et al. |
| 2014/0065483 | A1 | 3/2014 | Park et al. |
| 2014/0162119 | A1 | 6/2014 | Takei et al. |
| 2015/0016024 | A1 | 1/2015 | Choi et al. |
| 2015/0147651 | A1 | 5/2015 | Hong et al. |
| 2015/0147655 | A1 | 5/2015 | Park et al. |
| 2015/0171423 | A1 | 6/2015 | Kim et al. |
| 2015/0243971 | A1 | 8/2015 | Cho et al. |
| 2015/0287984 | A1 | 10/2015 | Kong et al. |
| 2016/0043396 | A1* | 2/2016 | Sakai ............... H01M 4/505 429/223 |
| 2016/0211517 | A1 | 7/2016 | Beck et al. |
| 2016/0372748 | A1 | 12/2016 | Nakayama et al. |
| 2017/0179470 | A1 | 6/2017 | Choi et al. |
| 2017/0194637 | A1 | 7/2017 | Ahn et al. |
| 2017/0271653 | A1 | 9/2017 | Yamauchi et al. |
| 2017/0338488 | A1 | 11/2017 | Sun et al. |
| 2018/0026267 | A1 | 1/2018 | Kim et al. |
| 2018/0026268 | A1 | 1/2018 | Kim et al. |
| 2018/0145324 | A1 | 5/2018 | Liu et al. |
| 2018/0151876 | A1 | 5/2018 | Kim et al. |
| 2018/0159128 | A1 | 6/2018 | Kim et al. |
| 2018/0166687 | A1 | 6/2018 | Chang et al. |
| 2018/0212237 | A1 | 7/2018 | Lee et al. |
| 2019/0173076 | A1 | 6/2019 | Kim et al. |
| 2019/0260024 | A1 | 8/2019 | Nakamura et al. |
| 2019/0288285 | A1 | 9/2019 | Kim et al. |
| 2019/0326596 | A1 | 10/2019 | Yun et al. |
| 2021/0193999 | A1 | 6/2021 | Omae et al. |

FOREIGN PATENT DOCUMENTS

| | | |
|---|---|---|
| CN | 105609718 A | 5/2016 |
| CN | 105958062 A | 9/2016 |
| CN | 106784659 A | 5/2017 |
| CN | 106848241 A | 6/2017 |
| CN | 107644982 A | 1/2018 |
| CN | 108075111 A | 5/2018 |
| DE | 102017201313 A1 | 8/2018 |
| EP | 2744021 A1 | 6/2014 |
| EP | 3272710 | 1/2018 |
| EP | 3331065 | 6/2018 |
| EP | 3550640 A1 | 10/2019 |
| EP | 3550641 A1 | 10/2019 |
| EP | 3550643 A1 | 10/2019 |
| JP | 2008-204806 A | 9/2008 |
| JP | 2017-162614 A | 9/2017 |
| JP | 2018-014325 A | 1/2018 |
| KR | 10-2010-0076824 A | 7/2010 |
| KR | 10-1034227 B1 | 5/2011 |
| KR | 10-2011-0097719 A | 8/2011 |
| KR | 10-2014-0018628 A | 2/2014 |
| KR | 10-2014-0025793 A | 3/2014 |
| KR | 10-2014-0058800 A | 5/2014 |
| KR | 10-2015-0008308 A | 1/2015 |
| KR | 10-2015-0026864 A | 3/2015 |
| KR | 10-2015-0061474 A | 6/2015 |
| KR | 10-2015-0070853 A | 6/2015 |
| KR | 10-2015-0100406 A | 9/2015 |
| KR | 10-2016-0026402 A | 3/2016 |
| KR | 10-2016-0083638 A | 7/2016 |
| KR | 10-2017-0078892 A | 7/2017 |
| KR | 10-2017-0079942 A | 7/2017 |
| KR | 10-2017-0124202 A | 11/2017 |
| KR | 10-2018-0010122 A | 1/2018 |
| KR | 10-2018-0010123 A | 1/2018 |
| KR | 10-2018-0062429 A | 6/2018 |
| KR | 10-2018-0063849 A | 6/2018 |
| KR | 10-2018-0063857 A | 6/2018 |
| KR | 10-2018-0063858 A | 6/2018 |
| KR | 10-2018-0063859 A | 6/2018 |
| KR | 10-2018-0063860 A | 6/2018 |
| KR | 10-2018-0065944 A | 6/2018 |
| KR | 10-2019-0065963 A | 6/2019 |
| KR | 10-2019-0092281 A | 8/2019 |
| WO | WO 2011-089958 A1 | 7/2011 |
| WO | WO 2018-020845 A1 | 2/2018 |
| WO | WO 2018-137942 A1 | 8/2018 |

OTHER PUBLICATIONS

Office Action dated Oct. 26, 2020, of the corresponding Japanese Patent Application No. 2019-207057 (5 pages).
Meng, Yujia, et al., "Synthesis of LiMn2O4 Nano-wires via Flux Method and Their Usage as Cathode Material for Lithium Ion Batteries," Chemical Research in Chinese Universities, 2015, vol. 31, No. 5, pp. 820-824.
Korean Office Action dated Mar. 23, 2021, issued in corresponding Korean Patent Application No. 10-2019-0146078 (7 pages).
Korean Office Action dated Mar. 30, 2021, issued in Korean Patent Application No. 10-2019-0147179 (8 pages).
EPO Extended Search Report dated Apr. 23, 2020, for corresponding European Patent Application No. 19208992.8 (6 pages).
EPO Extended Search Report dated May 6, 2020, corresponding to European Patent Application No. 19209524.8 (5 pages).
Song, Bohang, et al., "A facile cathode design combining Ni-rich layered oxides with Li-rich layered oxides for lithium-ion batteries," Journal of Power Sources, vol. 325, 2016, 10 pages.
Extended European Search Report for corresponding European Patent Application No. 20154668.6, dated Jul. 1, 2020, 9 pages.
Kim, Dongham et al., "Composite 'Layered-Layered-Spinel' Cathode Structures for Lithium-Ion Batteries", Journal of The Electrochemcal Society, Nov. 6, 2012, pp. 31-38.
West, W.C. et al., "Preparation of high quality layered-layered composite $Li_2MnO_3$_$LiMo_2$ (M=Ni, Mn, Co) Li-ion cathodes by a ball milling-annealing process", Journal of Power Sources, Elsevier SA, CH, vol. 204, Jan. 1, 2012, pp. 200-204.
Xi, Liujiang et al., "Layered $Li_2MnO_3$.$3LiNi_{0.5-xMn0.5-x}Co_{2x}O_2$ microspheres with Mn-rich cores as high performance cathode materials for lithium ion batteries", Physical Chemistry Chemical Physics, vol. 15, No. 39, Jan. 1, 2013, pp. 16579-16585.
Thackeray, Michael M., et al., "Advances in manganese-oxide 'composite' electrodes for lithium-ion batteries," Journal of Materials Chemistry, 2005, vol. 15, pp. 2257-2267.
Chinese Office Action, with English translation, dated Sep. 15, 2021, issued in Chinese Patent Application No. 202010078888.6 (27 pages).
Chinese Office Action dated Sep. 18, 2021, issued in corresponding Chinese Patent Application No. 201911111056.3 (21 pages).
Korean Office Action dated Sep. 27, 2021, issued in Korean Patent Application No. 10-2019-0014092 (6 pages).
U.S. Restriction Requirement dated Oct. 27, 2021, issued in U.S. Appl. No. 16/684,057 (7 pages).

(56) References Cited

OTHER PUBLICATIONS

Park et al., "Cycle mechanism and electrochemical properties of lithium manganese oxide prepared using different Mn sources" Materials Chemistry and Physics 112 (2008) 696-701 (Year: 2008).
Yu et al., "Nanofibers of LiMn2O4 by electrospinning". Journal of Colloid and Interface Science, ISSN: 0021-9797, vol. 285, Issue: 1, p. 163-166 (Year: 2005).
U.S. Office Action dated Jan. 20, 2022, issued in U.S. Appl. No. 16/684,057 (23 pages).
Restriction Requirement for U.S. Appl. No. 16/777,744 dated Apr. 13, 2022, 6 pages.
Office Action for U.S. Appl. No. 16/777,744 dated May 10, 2022, 20 pages.
Chinese Office Action dated Mar. 23, 2022 for CN Application No. CN201911111056.3, 9 pages.
Chinese Office Action dated Mar. 28, 2022 for CN Application No. CN202010078888.6, 6 pages.
U.S. Final Office Action dated Jul. 7, 2022, issued in U.S. Appl. No. 16/684,057 (24 pages).

* cited by examiner

Secondary Particle of
Lithium Nickel-based Composite Oxide

POSITIVE ACTIVE MATERIAL FOR RECHARGEABLE LITHIUM BATTERY, METHOD OF PREPARING THE SAME AND RECHARGEABLE LITHIUM BATTERY INCLUDING THE SAME

CROSS-REFERENCE TO RELATED APPLICATION

This application claims priority to and the benefit of Korean Patent Application No. 10-2018-0140150 filed in the Korean Intellectual Property Office on Nov. 14, 2018, the entire content of which is incorporated herein by reference.

BACKGROUND

1. Field

One or more aspects of example embodiments of the present disclosure are related to a positive active material for a rechargeable lithium battery, a method of preparing the same, and a rechargeable lithium battery including the same.

2. Description of the Related Art

As portable electronic devices, communication devices, and the like are developed, rechargeable lithium batteries having a high energy density are desired.

An example rechargeable lithium battery includes a positive electrode and a negative electrode, each of which may include an electrode active material layer including an electrode active material, formed on an electrode current collector. The positive active material is a material capable of intercalating lithium ions, and may be or include an oxide (such as lithium cobalt oxide ($Li_xCoO_2$), lithium nickel oxide ($Li_xNiO_2$), lithium nickel cobalt oxide ($Li_x(NiCo)O_2$), lithium nickel cobalt manganese oxide ($Li_x(NiCoMn)O_2$), spinel-type lithium manganese oxide ($Li_xMn_2O_4$), and/or manganese dioxide ($MnO_2$)), an olivine-type or NASICON-type phosphate (such as lithium iron phosphate ($Li_xFePO_4$), lithium manganese phosphate ($Li_xMnPO_4$), and/or the like), a silicates, a polymer material, and/or the like.

The negative electrode active material is a material capable of intercalating lithium ions, and may be or include lithium metal, an alloy thereof, a polymer material, and/or a carbon material, for example, a graphite-based material (such as artificial or natural graphite, and/or the like), non-graphitizable carbon, graphitizable carbon, carbon nanotubes (CNT), carbon nanofibers (CNF), carbon nanowalls (CNW), etc.

SUMMARY

One or more embodiments of the present disclosure are directed toward a positive active material for a rechargeable lithium battery having improved charge and discharge capacity, efficiency, and/or cycle-life characteristics by improving lithium diffusion (e.g., lithium diffusion rates) during charge and discharge, mitigating stress related to volume changes, and reducing unreacted residual lithium.

One or more example embodiments of the present disclosure are directed toward a method of preparing the positive active material for a rechargeable lithium battery.

One or more example embodiments of the present disclosure are directed toward a rechargeable lithium battery including the positive active material.

One or more example embodiments of the present disclosure provide a positive active material for a rechargeable lithium battery including: a lithium nickel-based composite oxide including a secondary particle in which a plurality of plate-shaped primary particles are agglomerated; and a lithium manganese composite oxide having (e.g., being present in) at least two crystal lattice structures, wherein the secondary particle has a regular array structure in which (003) planes of the primary particles are oriented in a vertical direction with respect to the surface of the secondary particle.

The lithium manganese composite oxide may be present or positioned on the surface of the lithium nickel-based composite oxide.

The lithium manganese composite oxide may be an oxide represented by Chemical Formula 1:

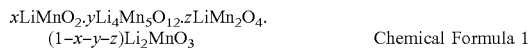

$$xLiMnO_2 \cdot yLi_4Mn_5O_{12} \cdot zLiMn_2O_4 \cdot (1-x-y-z)Li_2MnO_3 \qquad \text{Chemical Formula 1}$$

(0≤x<1, 0≤y<1, 0≤z<1, 0<y+z<1, and 0<x+y+z<1).

The lithium manganese composite oxide may include a cubic crystal lattice structure and a monoclinic crystal lattice structure, and optionally an orthorhombic crystal lattice structure.

The cubic crystal lattice structure may correspond to at least one selected from $LiMn_2O_4$ and $Li_4Mn_5O_{12}$, the monoclinic crystal lattice structure may correspond to $Li_2MnO_3$, and the orthorhombic crystal lattice structure may correspond to $LiMnO_2$.

The lithium manganese composite oxide may be included in an amount of about 0.1 wt % to about 5 wt % based on a total weight of the positive active material.

The lithium manganese composite oxide may have an average particle diameter of less than or equal to about 10 μm.

The positive active material may include unreacted residual lithium of less than or equal to about 1,300 ppm, and in some embodiments, less than or equal to about 1,000 ppm on the surface thereof.

The lithium nickel-based composite oxide may have a porosity of about 1% to about 8%.

The lithium nickel-based composite oxide may have a specific surface area of about 0.3 m²/g to about 0.8 m²/g.

The secondary particle may have a single-centered radial arrangement structure (e.g., of constituent primary particles) having one center, or a multi-centered radial arrangement structure having a plurality of centers.

One or more example embodiments of the present disclosure provide a method of preparing the positive active material for a rechargeable lithium battery including: mixing a metal hydroxide precursor and a lithium source to prepare a first mixture; first heat-treating the first mixture under a high temperature condition to prepare a first fired product including residual lithium; mixing the first fired product with manganese-based oxide to prepare a second mixture; and second heat-treating the second mixture to prepare a second fired product.

The second mixture may further include a second lithium source.

The first heat-treating may be performed at about 750° C. to about 950° C.

The manganese-based oxide may be mixed in an amount of about 0.1 to about 5 parts by weight based on 100 parts by weight of the first fired product.

One or more example embodiments of the present disclosure provide a rechargeable lithium battery including the positive electrode including a positive active material; a negative electrode; and an electrolyte.

Other specific details of the embodiment of the present invention are included in the detailed description below.

The lithium nickel-based composite oxide including secondary particles including (e.g., consisting of) primary particles with the above-described surface orientation may have improved battery capacity by facilitating movement of lithium between the surface of the active material and the electrolyte. Also, residual lithium content generated on the surface of the positive active material particle during preparation of the positive active material may be reduced when lithium manganese composite oxide is combined with the lithium nickel-based composite oxide. Accordingly, it is possible to reduce gas generation and side reactions and obtain a rechargeable lithium battery having phase stability and improved cycle-life and capacity characteristics.

DETAILED DESCRIPTION

Figure 1A:
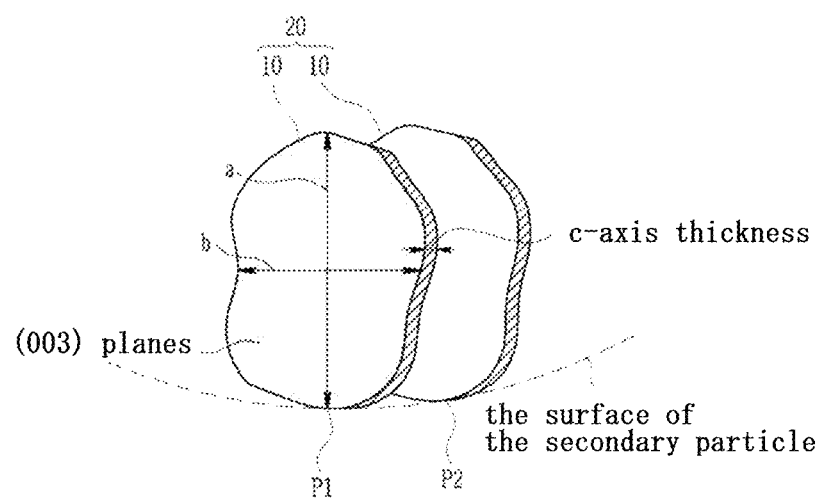
FIG. 1A is a schematic view of oriented primary particles of a lithium nickel-based composite oxide, as included in the positive active material according to embodiments of the present disclosure.

Reference will now be made in more detail to example embodiments, examples of which are illustrated in the accompanying drawings, wherein like reference numerals refer to like elements throughout and duplicative descriptions thereof may not be provided. In this regard, the present example embodiments may have different forms and should not be construed as being limited to the descriptions set forth herein. Accordingly, the example embodiments are merely described below, by referring to the figures, to explain aspects of the present description. The present disclosure is not limited thereto and the present disclosure is defined by the scope of claims.

The thicknesses of layers, films, panels, regions, etc., may be exaggerated in the drawings for clarity. It will be understood that when an element such as a layer, film, region, or substrate is referred to as being "on" another element, it can be directly on the other element or intervening element(s) may also be present. In contrast, when an element is referred to as being "directly on" another element, no intervening elements are present.

Expressions such as "at least one of", "one of", "selected from", "at least one selected from", and "one selected from", when preceding a list of elements, modify the entire list of elements and do not modify the individual elements of the list. Further, the use of "may" when describing embodiments of the present disclosure refers to "one or more embodiments of the present disclosure."

In an embodiment, the terms "size (particle)" and "average particle diameter" may refer to the average particle diameter D50. The average particle diameter D50 represents a particle diameter at 50% volume in a particle volume distribution, as measured using a laser diffraction particle distribution measurement method.

A positive active material for a rechargeable lithium battery according to an embodiment of the present disclosure includes a lithium nickel-based composite oxide including (e.g., in the form of) a secondary particle in which a plurality of plate-shaped primary particles are agglomerated; and a lithium manganese composite oxide having at least two crystal lattice structures, wherein the secondary particle has a regular array structure in which (003) planes of the primary particles are oriented in a vertical direction with respect to the surface of the secondary particle.

The positive active material includes the lithium manganese composite oxide to improve the structural stability of the positive active material. For example, although charging and discharging of a rechargeable lithium battery may, in general, cause cracking of the lithium nickel-based composite oxide, the lithium manganese composite oxide may suppress such cracking to thereby reduce side reactions with an electrolyte, reduce gas generation, and subsequently improve the charge and discharge characteristics of the cell. In addition, since the lithium manganese composite oxide is produced by reacting residual lithium remaining on the surface of the lithium nickel-based composite oxide with a manganese-based oxide, residual lithium existing in the inside and on the surface of the lithium nickel-based composite oxide may be reduced or decreased to further suppress side reactions of the positive active material and the electrolyte.

The lithium nickel-based composite oxide includes (e.g., may be in the form of) a secondary particle in which a plurality of plate-shaped primary particles are agglomerated, and the secondary particle may have a regular array structure in which the (003) planes (e.g., (003) planar surfaces) of the primary particles are oriented in a vertical direction with respect to the surface of the secondary particle. Hereinafter, the lithium nickel-based composite oxide is described referring to FIGS. 1A and 1B.

FIG. 1A is a schematic view showing oriented primary particles 10 formed or composed of a lithium nickel-based composite oxide, as included in secondary particles 20 of the positive active material according to embodiments of the present disclosure. The dimensions of each primary particle 10 can be described in terms of a, b, and c axes, where the "a axis" refers to the longest dimension, the "b axis" refers to the intermediate dimension, and the "c axis" refers to the shortest dimension or thickness of the particle. In some embodiments, the a, b, and c axes additionally correspond to the crystal lattice coordinates (Miller indices) h, k, and l, such that crystal planes normal to e.g., the c axis may be denoted as (001) and may form a planar surface of the primary particle. Referring to FIG. 1A, the (003) planes of primary particles 10 are oriented in a vertical direction with respect to the surface of the secondary particle (dashed line). As used herein to describe the secondary particle, the term "surface" refers to the outermost surface of the secondary particle (as approximated, for example, as a sphere or ellipsoid enclosing the secondary particle). As used herein to refer to the positioning or orientation of the primary particles, the terms "vertical direction", "normal", and/or "perpendicular" indicate that one selected from a long axis (a axis) and a short axis (b axis) of the (003) plane crosses the surface of the secondary particle (e.g., crosses a plane tangent to the surface of the secondary particle at the point of intersection) at an angle of about 70° to about 110°, or for example, about 80° to about 100°. When the (003) plane of the primary particles 10 is oriented so as to be perpendicular to the surface of the secondary particles 20, a relatively large number of lithium diffusion passages between boundaries are formed on a shell side (e.g., on or along the outermost surface and/or portion) of the secondary particles 20, and a lithium diffusion degree (e.g., lithium diffusion rates) may be increased by exposing a large amount (surface area) of the crystal surfaces capable of lithium transfer, thereby securing high initial efficiency and capacity. In addition, the above-described structure may suppress or reduce stress caused by volume changes of the secondary particles 20 during charge and discharge, thereby suppressing or reducing the occurrence of cracks.

FIG. 1A shows an example secondary particle composed of (including) two primary particles (P1 and P2), but it will be understood that three or more primary particles may be agglomerated to form secondary particles, and/or that the two particles in FIG. 1A represent a portion of an example secondary particle.

As used herein, the term "core" refers to a region of about 65% to about 85% of the length from the center to the surface of the secondary particle 20 (e.g., the inner 65% to 85% length of the radius). For example, in the lithium nickel-based composite oxide according to embodiments of the present disclosure, the core may encompass the volume of the secondary particle except for the region within about 2 μm from the outermost surface of the secondary particle. In addition, the term "shell" refers to a region of about 5% to about 15% of the length from the outermost surface of the secondary particle to the center of the secondary particle 20 (e.g., the outer 5% to 15% length of the radius). For example, in the lithium nickel-based composite oxide according to embodiments of the present disclosure, the shell may encompass the volume within about 2 μm of the outermost surface of the lithium nickel-based composite oxide. The term "intermediate layer" refers to the remaining region or volume except for (e.g., not included in) the core and the shell. As used herein, the orientation of the primary particles 10 shown in FIG. 1A may predominantly apply to primary particles in the shells of the secondary particle 20. For example, two or more primary particles 10 in the shell region of the secondary particle 20 may be oriented in a vertical direction with respect to the surface of the secondary particle 20.

The lithium manganese composite oxide may be present on the surface of the lithium nickel-based composite oxide. In some embodiments, for example, the lithium manganese composite oxide may be arranged or positioned discontinuously in an island (island shape) on the surface of the lithium nickel-based composite oxide. In some embodiments, the lithium manganese composite oxide may form a substantially uniform or substantially continuous coating layer on the outer surface of the lithium nickel-based composite oxide. Further, in some embodiments when the coating layer is substantially continuous, the lithium manganese composite oxide may substantially cover the entire surface of the lithium nickel-based composite oxide.

Figure 1B:
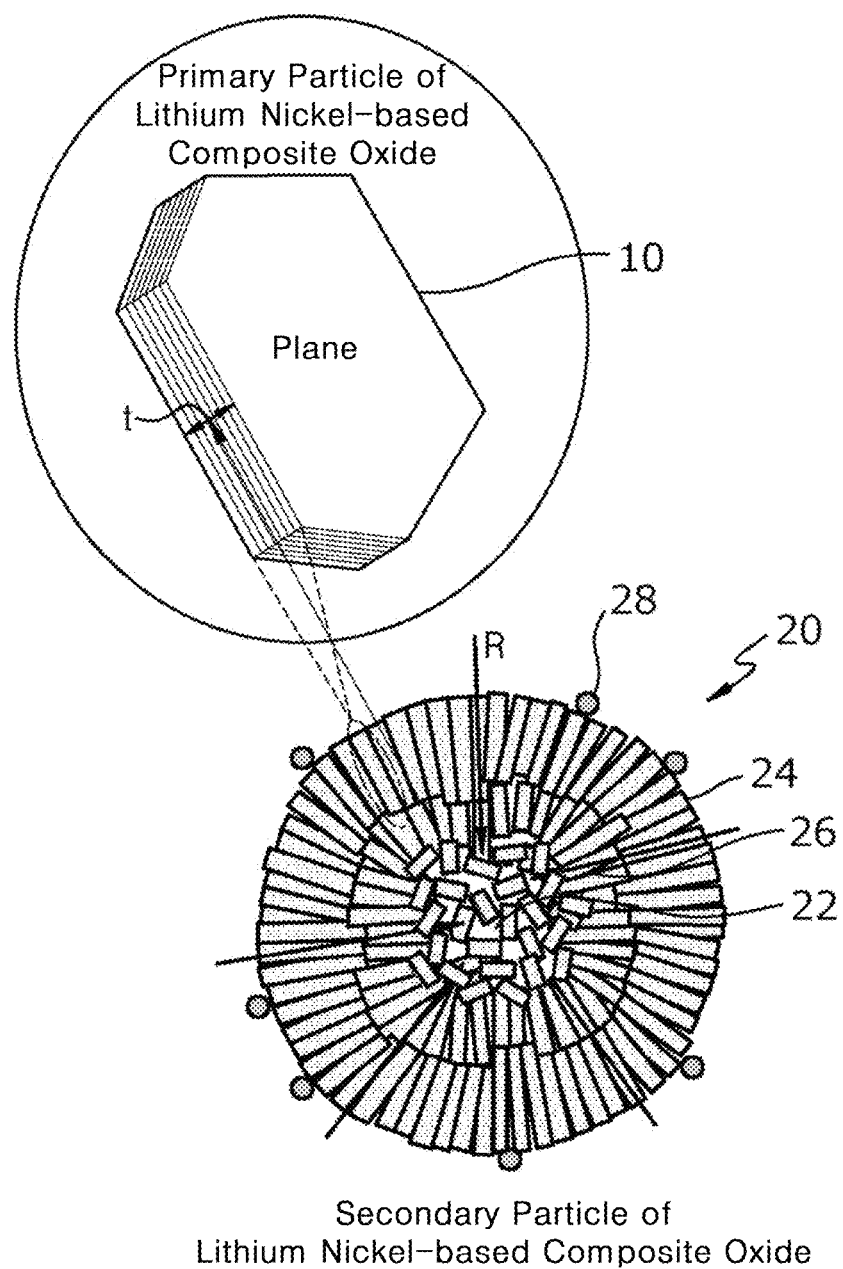
FIG. 1B is a schematic view of a secondary particle 20 in which a plurality of plate-shaped lithium nickel-based composite oxide primary particles 10 are agglomerated, according to embodiments of the present disclosure.

FIG. 1B is a schematic view of a secondary particle 20 in which a plurality of plate-shaped lithium nickel-based composite oxide primary particles 10 are agglomerated, according to embodiments of the present disclosure. The secondary particle 20 includes a core 22, a shell 24, and an intermediate layer 26 between the core 22 and the shell 24. As depicted by the planes within the primary particles 10 shown in the inset, as translated into the context of the secondary particle 20, (003) planes of the primary particles 10 are oriented in a vertical direction with respect to an outermost surface of the secondary particle 20 (e.g., along the direction R). In FIG. 1B, island-shaped particles of the lithium manganese composite oxide 28 are on the outermost surface of the secondary particle 20. Furthermore, FIG. 1B depicts a particle having a single-center radial arrangement structure. However, it will be understood that embodiments of the present disclosure are not limited thereto, and the lithium manganese composite oxide 28 may be present in other structures or formats, and/or the particle may have a multi-centered radial arrangement structure, as described herein.

The lithium manganese composite oxide may effectively block or reduce side reactions between the lithium nickel-based composite oxide and the electrolyte solution when it is present on the surface of the lithium nickel-based composite oxide. Further, the lithium manganese composite oxide may enable a higher lithium ion diffusion degree (rate) by reducing the resistance on the surface of the positive active material, such that the rate capability and output characteristics of the battery may be improved.

In addition, the lithium manganese composite oxide may be included in an amount of greater than or equal to about 0.1 wt %, for example, greater than or equal to about 0.2 wt %, greater than or equal to about 0.3 wt %, greater than or equal to about 0.4 wt %, or greater than or equal to about 0.5 wt % based on a total weight (100 wt %) of the positive active material; and less than or equal to about 5 wt %, for example less than or equal to about 4 wt %, less than or equal to about 3 wt %, less than or equal to about 2 wt %, or less than or equal to about 1 wt % based on a total weight (100 wt %) of the positive active material. When the amount of the lithium manganese composite oxide is within the above-described range, the residual lithium may be decreased, and capacity characteristics may be improved.

The lithium manganese composite oxide may have an average particle diameter of less than or equal to about 10 μm, for example less than or equal to about 8 μm, less than or equal to about 5 μm, less than or equal to about 3 μm, or less than or equal to about 1 μm. When the average particle diameter is within the above-described ranges, the lithium manganese composite oxide may be suitably present on the surface of the lithium nickel-based composite oxide. As a result, it is possible to effectively block side reactions between the lithium nickel-based composite oxide and electrolyte solution. Further, a lithium ion diffusion degree (rate) may be improved, and thus the rate capability of the battery may be improved, and the output characteristics of the battery may be improved due to decreased resistance at the surface of the positive active material.

In embodiments of the present disclosure, when the lithium manganese composite oxide is present on the surface of the lithium nickel-based composite oxide (for example, as a plurality of island-shaped particles), at least a portion of the primary particles at the surface of the lithium nickel-based composite oxide, for example, those adjacent to the lithium nickel-based composite oxide are thereby formed or arranged as a flower-shaped surface. As used herein, the term "flower-shaped surface" may indicate that the primary particles are formed or arranged in the shape of flower petals, such as those of a chrysanthemum, so that the thicknesses of the particles are aligned with a range of directions, and are not stacked in (along) a single direction. As such, spaces (channels) are formed between the arranged primary particles. In some embodiments, when the amount of lithium manganese composite oxide is increased, the surface area on the secondary particle having a flower-shape is accordingly increased.

The lithium manganese composite oxide may be represented by Chemical Formula 1:

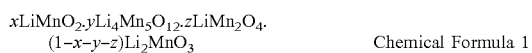

Chemical Formula 1

(0≤x<1, 0≤y<1, 0≤z<1, 0<y+z<1, and 0<x+y+z<1)

For example, the lithium manganese composite oxide may be a composite or mixture of two or more lithium manganese oxide compositions. The lithium manganese composite oxide may have (e.g., be present in) at least two types of crystal lattice structures. In some embodiments, for example, each identifiable lithium manganese oxide composition in the lithium manganese composite oxide may have a crystal lattice structure same or different from the others, with at least two being present. For example, the lithium manganese composite oxide may include a cubic crystal lattice structure and a monoclinic crystal lattice structure, and optionally an orthorhombic crystal lattice structure. Unlike a general lithium nickel-based composite oxide, which has a layered crystal lattice structure (e.g., a layered α-NaFeO$_2$ structure), in which lithium ions tend to diffuse only between separated metal oxide layers, the lithium manganese composite oxide according to an embodiment of the present disclosure may include a cubic crystal lattice structure and a monoclinic crystal lattice structure, and optionally an orthorhombic crystal lattice structure, in which lithium ions may diffuse in three dimensions. Therefore, compared to the two-dimensional movement of lithium ions in the layered crystal lattice structure, the three-dimensional movement or diffusion of lithium ions in the crystal lattice structures of the lithium manganese composite oxide is smoother and faster, thereby facilitating intercalation and deintercalation of lithium ions. In addition, the crystal formation of lithium manganese composite oxide may enable removal of unreacted residual lithium present on the surface of the lithium nickel-based composite oxide, thereby removing a sheet resistance layer, and facilitating intercalation and deintercalation of lithium ions.

The lithium manganese composite oxide having the cubic crystal lattice structure may be at least one selected from LiMn$_2$O$_4$ and Li$_4$Mn$_5$O$_{12}$, the lithium manganese composite oxide having the monoclinic crystal lattice structure may be Li$_2$MnO$_3$, and the lithium manganese composite oxide having the orthorhombic crystal lattice structure may be LiMnO$_2$. When the lithium manganese composite oxide includes two or more of the above compositions and/or crystal lattice structures, amounts of residual lithium and gas generated at the surface may be reduced, and the cycle-life and capacity characteristics of the rechargeable lithium battery may be improved.

The crystal lattice structure(s) of the lithium manganese composite oxide may be confirmed through transmission electron microscopy (TEM). The surface contents of elements, such as lithium, may be measured through X-ray photoelectron spectroscopy (XPS), transmission electron microscopy, and/or energy dispersive X-ray spectroscopy (EDS). In addition, the amount of residual lithium on the surface of the lithium nickel-based composite oxide may be measured using inductively coupled plasma-atomic emission spectrometer (ICP-AES). The lithium nickel-based composite oxide may be a porous particle including a plurality of pores therein. A total porosity of the particle may be greater than or equal to about 1%, greater than or equal to about 1.5%, greater than or equal to about 2.0%, or greater than or equal to about 2.5%, and less than or equal to about 8%, less than or equal to about 7.5%, less than or equal to about 7.0%, or less than or equal to about 6.5%. The term "porosity" is used herein in the same sense as a pore volume fraction, and is calculated as the ratio of the pore volume to the total particle volume. Internal pores (e.g., closed pores) may effectively or suitably accommodate changes in the structure of the positive active material during charge and discharge.

In some embodiments, the lithium nickel-based composite oxide may have a specific surface area of about 0.3 m$^2$/g to about 0.8 m$^2$/g. When the specific surface area is within the above-described range, the cycle-life characteristics of the battery may be improved. The specific surface area may be measured using a Brunauer-Emmett-Teller (BET) method. For example, a nitrogen gas adsorption BET 6-point method may be conducted using a porosimetry analyzer (Belsorp-II Mini, Bell Japan Inc.).

The primary particles 10 oriented as described above are agglomerated with each other to form the secondary particle 20. For example, the plurality of primary particles 10 may be agglomerated with each other to provide a secondary particle 20 having a radial array structure. For example, one selected from the a axis and b axis, for example, the a axis or longest dimension of each particle, may be aligned with a radius of the particle. The plurality of primary particles 10 may be oriented (e.g., along each respective radius) toward one (e.g., a single) center so as to form interfacial contacts along the c-axis (thickness) direction of the primary particles 10, thereby providing the secondary particle 20 having a radial array structure. In another embodiment, the secondary particle 20 may have a multi-centered radial array structure having a plurality of centers. Here, the term "center(s)" refers to one or more origin points around which primary particles are aligned. When the secondary particle 20 has a one-centered or multi-centered radial array structure as described above, lithium may be easily intercalated and deintercalated into the center of the secondary particle 20.

An unreacted residual lithium content present on the surface of the positive active material may be less than or equal to about 1,300 ppm, less than or equal to about 1,200 ppm, less than or equal to about 1,100 ppm, or less than or equal to about 1,000 ppm.

The residual lithium content may be composed of Li$_2$CO$_3$ and LiOH remaining on the surface of the positive active material after synthesis. In general, a relatively large positive active material particle size is desirable for high battery capacity, but in this case, since the surface area is relatively low, the rate capability and initial capacity may be decreased due to a reduction (decrease) of the active area in contact with an electrolyte solution. In order to solve this problem, the positive active material according to an embodiment of the present disclosure is a lithium nickel-based composite oxide including secondary particles in which a plurality of plate-shaped primary particles are agglomerated and arranged as described above. However, in this positive active material including secondary particles having a developed surface orientation (e.g., a high degree of vertical alignment with respect to the outermost surface of the secondary particle, as described above), lithium ions may react with moisture, $CO_2$, and/or the like in the air and thus may easily form impurities (such as $Li_2CO_3$, LiOH, and/or the like), on the surface of the active material, which may deteriorate battery capacity or be decomposed inside the battery to generate gas and cause battery swelling, resulting in serious problems of deteriorating high temperature stability and/or the like. However, the lithium manganese composite oxide according to embodiments of the present disclosure is prepared by reacting the unreacted residual lithium on the surface of the secondary particles with a manganese-based oxide, thus preventing or reducing the aforementioned problems of the lithium nickel-based composite oxide.

The lithium nickel-based composite oxide may be a compound represented by Chemical Formula 2.

$$Li_a(Ni_{1-x-y-z}Co_xMn_yM_z)O_2 \qquad \text{Chemical Formula 2}$$

($0.95 \le a \le 1.3$, $x \le (1-x-y-z)$, $y \le (1-x-y-z)$, $0 < x < 1$, $0 \le y < 1$, and $0 \le z < 1$)

In Chemical Formula 2, M is at least one element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), $x \le (1-x-y-z)$, $y \le (1-x-y-z)$, $0 < x < 1$, $0 \le y < 1$, and $0 \le z < 1$. In some embodiments, in Chemical Formula 2, $0 < x \le 0.33$, $0 \le y \le 0.5$, $0 \le z \le 0.05$, $0.33 \le (1-x-y-z) \le 0.95$. In some embodiments, in Chemical Formula 2, $0.5 \le (1-x-y-z) \le 0.95$. The lithium nickel-based composite oxide represented by Chemical Formula 2 may be, for example, $LiNi_{0.6}Co_{0.2}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, or $LiNi_{0.85}Co_{0.1}Al_{0.05}O_2$.

Another embodiment of the present disclosure provides a method of preparing the positive active material for a rechargeable lithium battery including: mixing a metal hydroxide precursor and a lithium source to prepare a first mixture; first heat-treating the first mixture under a high temperature condition to prepare a first fired product including residual lithium; mixing the first fired product with manganese-based oxide to prepare a second mixture; and second heat-treating the second mixture to prepare a second fired product.

First, the metal hydroxide precursor is prepared.

The metal hydroxide precursor may be prepared through first, second, and third processes of forming a core, an intermediate layer, and a shell. In the first, second, and third processes, conditions such as concentrations and input amounts of metal-containing raw materials, a concentration and an input amount of ammonia water as a complex (complexing) agent, an input amount of a pH controlling agent, and/or the like may be changed or varied as described herein.

As used herein, the term "core" refers to a region of about 65% to about 85% of the length from the center to the surface of the secondary particle 20 (e.g., the inner 65% to 85% length of the radius). For example, in the metal hydroxide precursor, the core may encompass the volume of the secondary particle except for the region within about 2 μm from the outermost surface of the metal hydroxide precursor particle. In addition, the term "shell" refers to a region of about 5% to about 15% of the length from the outermost surface of the metal hydroxide precursor particle to the center of the metal hydroxide precursor particle (e.g., the outer 5% to 15% length of the radius). For example, in the metal hydroxide precursor according to embodiments of the present disclosure, the shell may encompass the volume within about 2 μm of the outermost surface of the metal hydroxide precursor. The term "intermediate layer" refers to the remaining region or volume except for (e.g., not included in) the core and the shell in the metal hydroxide precursor.

The method of preparing the positive active material according to embodiments of the present disclosure includes a first process of forming the core of the metal hydroxide precursor.

First, the complex agent and the pH controlling agent (e.g., ammonia water) are put in a reactor, and the metal-containing raw materials are added thereto and reacted. If the pH of the reaction mixture in the reactor changes as the reaction progresses, additional amounts of the pH controlling agent may be added thereto to control the pH. In some embodiments, the complex agent may have (be added at) a concentration of about 0.1 M to about 0.7 M, for example, about 0.2 M to about 0.5 M. The metal-containing raw materials may have (be added at) concentrations of about 0.1 M to about 3.5 M, for example, about 2 M. The input amount of the complex agent may be about 6 mL/min to about 12 mL/min, for example about 8 mL/min to about 12 mL/min, and the input amounts of the metal-containing raw materials (e.g., lithium and transition metal-containing reactants) may be about 50 mL/min to about 100 mL/min.

The method of preparing the positive active material according to embodiments of the present disclosure includes a second process of forming the intermediate layer of the metal hydroxide precursor.

The metal-containing raw materials and the complex agent are added to the resultant of the first process to control the pH of the reaction mixture, and then, the second process is performed. For example, in the second process, the input amount and the concentration of the metal-containing raw materials and the complex agent are increased in order to prevent or slow a decrease in the growth rate of particles after reacting the product from the first process for a set or predetermined time. In some embodiments, a concentration of the complex agent may be about 0.3 M to about 1.0 M and the input amount of the complex agent may be about 8 mL/min to about 15 mL/min. The metal raw materials may have concentrations of about 0.1 M to about 3.5 M, for example, about 2 M and the input amounts of the metal-containing raw materials may be about 90 mL/min to about 120 mL/min.

The method of preparing the positive active material according to embodiments of the present disclosure includes a third process of forming the shell of the metal hydroxide precursor, thereby fully completing formation of the metal hydroxide precursor.

The input amounts and the concentrations of the metal-containing raw materials and the complex agent are further increased in order to prevent or slow a decrease in the growth rate of particles after reacting a reaction product from the second process for a set or predetermined time. For example, the concentration of the complex agent may be about 0.35 M to about 1.0 M and the input amount of the complex agent may be about 12 mL/min to about 20 mL/min. The metal raw materials may have concentrations of about 0.1 M to about 3.5 M, for example, about 2 M and the input amounts of the metal-containing raw materials may be about 120 mL/min to about 150 mL/min. In some embodiments, the reaction conditions used in the third process may have a large influence on the surface depth of a porous layer of the metal hydroxide precursor.

The first to third processes share the following common conditions.

In each process, the agitation power may be about 0.1 $kW/m^3$ to about 6 $kW/m^3$, for example, about 1 $kW/m^3$ to about 3 kW/m³. In the second and third processes, the agitation power may be decreased compared to the first process, but the agitation power of the second and third processes may be the same.

The pH of the reaction mixture may be adjusted to a range of about pH 10 to about pH 12. The pH controlling agent may control or modulate the pH of the reaction mixture to control or modulate formation of a precipitate from the reaction mixture. Non-limiting examples of the pH controlling agent include sodium hydroxide (NaOH), sodium carbonate ($Na_2CO_3$), sodium oxalate ($Na_2C_2O_4$), and the like. In some embodiments, the pH controlling agent may be sodium hydroxide (NaOH).

The concentration of the complex agent increases sequentially from the first process to the second process and then the third process and may thus range from about 0.1 M to about 0.7 M. The complex agent plays a role in controlling the rate of precipitate formation in a co-precipitation reaction. In some embodiments, the complex agent may be ammonia water and/or citric acid. In some embodiments, the complex agent may be ammonia water. Any suitable amount of the complex agent may be used in each process according to the principles herein.

The internal porosity of the metal hydroxide precursor particles is affected by the time of applying each process described above.

Since pores between (001) crystal planes are appropriately or suitably maintained due to minimized or decreased exposure of (001) crystal planes, the metal hydroxide precursor may have excellent structural stability.

The metal hydroxide precursor may be represented by $Me(OH)_2$ (wherein Me includes nickel, cobalt, manganese, and M of Chemical Formula 2), for example a compound represented by Chemical Formula 3.

$$(Ni_{1-x-y-z}Co_xMn_yM_z)(OH)_2 \qquad \text{Chemical Formula 3}$$

In Chemical Formula 3, M is at least one element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), $x \leq (1-x-y-z)$, $y \leq (1-x-y-z)$, $0<x<1$, $0 \leq y<1$, and $0 \leq z<1$. In some embodiments, in Chemical Formula 3, $0<x \leq 0.33$, $0 \leq y \leq 0.5$, $0 \leq z \leq 0.05$, and $0.33 \leq (1-x-y-z) \leq 0.95$. In some embodiments, in Chemical Formula 3, $0.5 \leq (1-x-y-z) \leq 0.95$. The metal hydroxide precursor represented by Chemical Formula 3 may be, for example, $Ni_{0.6}Co_{0.2}Mn_{0.2}(OH)_2$, $Ni_{0.5}Co_{0.2}Mn_{0.3}(OH)_2$, $Ni_{1/3}Co_{1/3}Mn_{1/3}(OH)_2$, $Ni_{0.8}Co_{0.1}Mn_{0.1}(OH)_2$, $Ni_{0.85}Co_{0.1}Al_{0.05}(OH)_2$, or $Ni_{0.85}Co_{0.1}Al_{0.05}(OH)_2$.

Hereinafter, a method of preparing the positive active material for a rechargeable lithium battery is described.

First, the metal hydroxide precursor and a lithium source are mixed to prepare a first mixture. The lithium source may be, for example, lithium hydroxide, lithium fluoride, lithium carbonate, or a mixture thereof.

A mixing ratio of the lithium source and the metal hydroxide precursor may be stoichiometrically controlled to produce the lithium nickel-based composite oxide of Chemical Formula 2.

The mixing may be dry mixing or may be performed using a mixer (wet mixer) and/or the like. The dry mixing may be performed using milling. The milling may be performed so that the metal hydroxide precursor used as the starting material is hardly deformed (e.g., not subject to pulverization). For this purpose, it is necessary to control a size of the lithium source mixed with the metal hydroxide precursor in advance. The lithium source may have a size (average particle diameter) of about 5 μm to about 20 μm, for example, about 10 μm. When the internal temperature of the mixer is increased above 30° C. during the above milling process, the internal temperature of the mixer may be cooled to maintain it at room temperature, 25° C.

The first mixture may be first heat-treated under a high temperature condition to prepare a first fired product.

The first heat-treating may be performed at a high temperature of about 750° C. to about 950° C., for example, about 800° C. to about 900° C. In the first heat-treating, a temperature-increasing rate may be about 1° C./min to about 5° C./min, for example, about 3° C./min. The first heat-treating time may be changed depending on the first heat-treating temperature and the like, for example, in a range of about 3 hours to about 10 hours.

The first heat-treating may be performed under an air atmosphere or an oxidizing gas atmosphere.

For example, the term "oxidizing gas atmosphere" may indicate a gas atmosphere including oxygen (e.g., air). In the oxidizing gas atmosphere, the oxygen may be included in an amount of about 20 volume % to about 40 volume %.

The resultant first fired product is mixed with a manganese-based oxide to obtain a second mixture.

The manganese-based oxide may be at least one selected from $Mn_2O_3$ and $MnO_2$.

The first fired product may include the lithium nickel-based composite oxide and unreacted residual lithium.

The mixing may be dry mixing, or may be performed using a mixer (wet mixer) and/or the like. The dry mixing may be performed using milling.

The manganese-based oxide may be mixed in an amount of about 0.1 to about 5 parts by weight, for example, about 0.3 to about 2 parts by weight based on 100 parts by weight of the first fired product. When the first fired product and the manganese-based oxide are mixed within the above-described range, a reduction effect of the unreacted residual lithium may be improved, and increased capacity and structural stability of a rechargeable lithium battery may be secured.

In some embodiments, the second mixture may further include a lithium source. When the metal hydroxide precursor has a low nickel content, the amount of residual lithium may be low, and the second mixture may be additionally mixed with the same lithium source as that used in the first mixture.

The second mixture is subjected to second heat-treating to prepare a second fired product.

The second heat-treating may be performed under an air atmosphere or an oxidizing gas atmosphere, similar to the first heat-treating.

In some embodiments, the second heat-treating may be performed at about 300° C. to about 600° C., for example, about 350° C. to about 500° C. or about 370° C. to about 450° C. The rate of temperature increase during the second heat-treating may be about 1° C./min to about 5° C./min, for example 3° C./min. The second heat-treating time is variable, and for example, may be about 3 hours to 10 hours. When the second heat-treating temperature is in the above-described range, a reduction effect of unreacted residual lithium may be improved and the lithium manganese composite oxide may be easily formed, thereby ensuring structural stability of the positive active material.

The positive electrode and the negative electrode according to embodiments of the present disclosure may be formed by applying a composition for forming a positive active material layer and a composition for forming a negative active material layer to respective current collectors, and drying each composition.

The composition for forming the positive active material layer may be formed by mixing a positive active material, a conductive agent, a binder, and a solvent, wherein the positive active material is as described above.

The binder is a component that assists in binding of the active material to the conductive agent and to the current collector. The binder may be added in an amount of about 1 to about 50 parts by weight based on a total weight of 100 parts by weight of the positive active material. Non-limiting examples of the binder include polyvinylidene fluoride, polyvinyl alcohol, carboxylmethyl cellulose (CMC), starch, hydroxypropyl cellulose, regenerated cellulose, polyvinylpyrrolidone, polytetrafluoroethylene, polyethylene, polypropylene, an ethylene-propylene-diene terpolymer (EPDM), sulfonated EPDM, a styrene butadiene rubber, a fluoro rubber, and various copolymers. An amount of the binder may be about 2 to about 5 parts by weight based on a total weight of 100 parts by weight of the positive active material. When the amount of the binder is in the above-described range, a binding force of the active material layer to the current collector may be improved.

The conductive agent is not particularly limited as long as it has electron conductivity without causing unwanted chemical changes (reactions) in the battery. Non-limiting examples include graphite (such as natural graphite and/or artificial graphite); a carbon-based material (such as carbon black, acetylene black, Ketjenblack, channel black, furnace black, lamp black, thermal black, and/or the like); a conductive fiber (such as a carbon fiber and/or a metal fiber); carbon fluoride; a metal powder (such as aluminum and/or a nickel powder); a conductive whisker (such as zinc oxide and/or potassium titanate); a conductive metal oxide (such as titanium oxide); and/or a conductive material (such as a polyphenylene derivative). An amount of the conductive agent may be about 2 to about 5 parts by weight based on a total weight of 100 parts by weight of the positive active material. When the amount of the conductive agent is in the above-described range, the conductivity of the finally obtained electrode may be improved.

Non-limiting examples of the solvent include N-methylpyrrolidone and/or the like. An amount of the solvent may be about 10 to about 100 parts by weight based on 100 parts by weight of the positive active material. When the amount of the solvent is in the range, the active material layer may be easily formed.

The positive current collector may be about 3 μm to about 500 μm thick, and is not particularly limited as long as it has high conductivity without causing unwanted chemical changes (reactions) in the battery. Non-limiting examples of the material for the positive current collector include stainless steel, aluminum, nickel, titanium, heat-treated carbon, and/or aluminum and/or stainless steel that has been surface-treated with carbon, nickel, titanium, silver, and/or the like. The current collector may include a fine concavo-convex micro-texture on its surface to enhance adherence of positive active materials, and may be in any suitable form (such as a film, a sheet, a foil, a net, a porous body, a foam, and/or a nonwoven fabric body).

A composition for forming a negative active material layer may be prepared by mixing a negative active material, a binder, a conductive agent, and a solvent. The negative active material is a material capable of intercalating and releasing (deintercalating) lithium ions. As non-limiting examples of the negative active material, a carbon-based material (such as graphite and/or carbon), a lithium metal, an alloy thereof, and a silicon oxide-based material may be used. In some embodiments, silicon oxide may be used.

The binder, the conductive agent, and the solvent may be the same types or kinds of materials as described for the positive electrode. The binder may be added in an amount of about 1 to about 50 parts by weight based on a total weight of 100 parts by weight of the negative active material. The conductive agent may be added in an amount of about 1 to about 5 parts based on a total weight of 100 parts by weight of the negative active material. When the amount of the conductive agent is within the above-described range, the conductivity characteristics of the finally obtained electrode may be improved. An amount of the solvent may be about 10 to about 100 parts by weight based on a total weight of 100 parts by weight of the negative active material. When the amount of the solvent is within the above-described range, the negative active material layer may be easily formed.

The negative current collector may be about 3 μm to about 500 μm thick. The material for the negative current collector is not particularly limited as long as it has high conductivity without causing unwanted chemical changes (reactions) in the battery and may be, for example, copper, stainless steel, aluminum, nickel, titanium, heat-treated carbon, copper and/or stainless steel that has been surface-treated with carbon, nickel, titanium, silver, and/or the like, an aluminum-cadmium alloy, and/or the like. In addition, the negative current collector may include a fine concavo-convex micro-texture on its surface to enhance adherence of negative active materials, and may be in any suitable form (such as a film, a sheet, a foil, a net, a porous body, a foam and a nonwoven fabric body), similar to the positive current collector.

A separator is positioned between the positive electrode and the negative electrode. The separator may have a pore diameter of about 0.01 μm to about 10 μm and a thickness of about 5 μm to about 300 μm. Non-limiting examples of the material for the separator include polypropylene, an olefin based polymer (such as polyethylene and the like); and a sheet made of a glass fiber and/or a non-woven fabric. When a solid electrolyte (such as a polymer) is used as the electrolyte, the solid electrolyte may also serve as a separator.

The electrolyte may be a non-aqueous electrolyte including a non-aqueous solvent and a lithium salt, an organic solid electrolyte, an inorganic solid electrolyte, and/or the like. The non-aqueous solvent may be for example, an aprotic organic solvent (such as N-methyl-2-pyrrolidinone, propylene carbonate, ethylene carbonate, butylene carbonate, dimethyl carbonate, diethyl carbonate, gamma-butyro lactone, 1,2-dimethoxyethane, 2-methyl tetrahydrofuran, dimethylsulfoxide, 1,3-dioxolane, formamide, N,N-dimethyl formamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, ethyl propionate, and/or the like). The lithium salt is dissolved in the non-aqueous solvent, and non-limiting examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, a lower aliphatic lithium carboxylate, tetraphenyl lithium borate, a lithium imide, and/or the like.

Non-limiting examples of the organic solid electrolyte include a polyethylene derivative, a polyethylene oxide derivative, a polypropylene oxide derivative, a phosphoric acid ester polymer, polyester sulfide, polyvinyl alcohol, polyvinylidene fluoride, and the like.

Non-limiting examples of the inorganic solid electrolyte include $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and the like.

Figure 5:
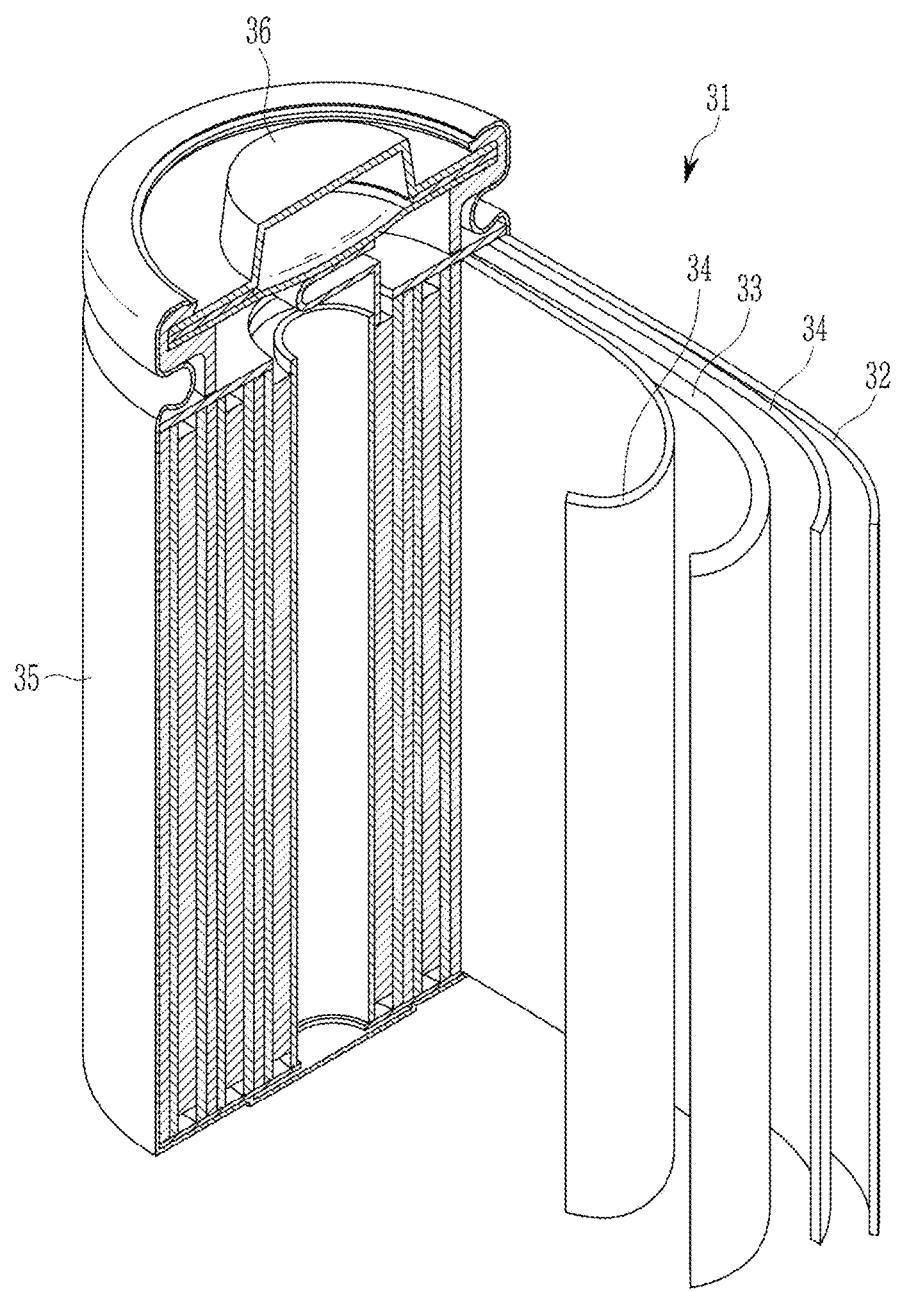
FIG. 5 is a perspective schematic view of a representative structure of a rechargeable lithium battery.

FIG. 5 is a perspective schematic view of a representative structure of a rechargeable lithium battery.

Referring to FIG. 5, a rechargeable lithium battery 31 includes a positive electrode 33 including the positive active material according to an embodiment of the present disclosure, a negative electrode 32, and a separator 34. The above-described positive electrode 33, the negative electrode 32, and the separator 34 are wound or folded and housed in a battery case 35. Then, an organic electrolyte solution (e.g., electrolyte) is injected and sealed in the battery case 35 with the cap assembly 36 to complete a rechargeable lithium battery 31. The battery case 35 may be cylindrical, prismatic, thin film-type, and/or the like.

The rechargeable lithium battery may be a lithium ion battery.

A separator may be between the positive electrode and the negative electrode and wound or laminated to form an electrode assembly. The electrode assembly may be housed in the case and impregnated with the organic electrolyte solution, and the case may then be sealed to complete a rechargeable lithium battery.

The rechargeable lithium battery may form a battery pack with a circuit, and a single pack or multiple packs may be used for devices requiring high capacity and high power, as needed. For example, the battery pack may be used for a laptop, a smart phone, electric vehicle, etc. The rechargeable lithium battery has excellent storage stability, cycle-life characteristics at high temperatures, and high-rate characteristics, and thus may be suitably used in an electric vehicle (EV). For example, the battery pack may be used for a hybrid vehicle such as a plug-in hybrid electric vehicle (PHEV).

The present disclosure is explained in more detail in the following examples and comparative examples. It is to be understood, however, that the examples are provided for the purpose of illustration, and are not to be construed as limiting the present disclosure.

EXAMPLES

Example 1

Example 1-1

Synthesis of Metal Hydroxide Precursor ($Ni_{0.6}Co_{0.2}Mn_{0.2}(OH)_2$)

In the following preparation processes, a 2M aqueous solution including nickel (II) sulfate, cobalt (II) sulfate, and manganese (II) sulfate was used as metal-containing raw materials for forming the metal hydroxide precursors.

[First Process: 1.5 kW/$m^3$ $NH_3.H_2O$ 0.30 M, pH 10 to 11, and Reaction Time of 6 Hours]

First, ammonia water ($NH_3.H_2O$) having a concentration of 0.30 M was prepared as a complex agent. The metal-containing raw materials and the complex agent (ammonia water) were added to a reactor at 90 mL/min and 10 mL/min, respectively, at 50° C. under an agitation power of 1.5 kW/$m^3$ thereby starting a reaction. NaOH was added thereto to maintain pH (e.g., maintain a pH between 10-11), and the reaction was performed for 6 hours. The core particles obtained as a reaction result had an average size (diameter) of about 5.5 μm to 6.5 μm, and were subsequently used in a second process.

[Second Process: 1.0 kW/$m^3$ $NH_3.H_2O$ 0.35 M, pH 10 to 11, and Reaction Time of 6 Hours]

The metal-containing raw materials and the complex agent were added thereto at 100 mL/min and 15 mL/min, respectively, while the reaction temperature was maintained at 50° C., such that the complex agent maintained a concentration of 0.35 M. NaOH was added thereto in order to maintain pH, and the reaction was performed for 6 hours. Herein, the reaction was performed at a lower agitation power of 1.0 kW/$m^3$ (compared to 1.5 kW/$m^3$ during the first process). Particles having a core and an intermediate layer produced from this reaction had an average size of 9 μm to 10 μm. A third process was subsequently performed as follows.

[Third Process: 1.0 kW/$m^3$ $NH_3.H_2O$ 0.40 M, pH 10 to 11, and Reaction Time of 4 Hours]

The metal-containing raw materials and the complex agent were added thereto at 150 mL/min and 20 mL/min, respectively, while the reaction temperature was maintained at 50° C., so that the complex agent maintained a concentration of 0.40 M. NaOH was added thereto in order to maintain pH, and the reaction was performed for 4 hours. Herein, the agitation power was maintained to be equal to that used in the second process.

[Post Process]

As for a post process, the resulting material was washed and hot air-dried at about 150° C. for 24 hours to obtain a metal hydroxide precursor ($Ni_{0.6}Co_{0.2}Mn_{0.2}(OH)_2$).

Example 1-2

Preparation of Positive Active Material

A first fired product including a lithium nickel-based composite oxide, $LiNi_{0.6}Co_{0.2}Mn_{0.2}O_2$, was obtained by mixing LiOH as a lithium source and the metal hydroxide precursor of $Ni_{0.6}Co_{0.2}Mn_{0.2}(OH)_2$ according to Example 1-1 in the same mole ratio, and then performing a first heat treatment. The first heat-treatment was performed by increasing the temperature from 25° C. to 850° C. at a rate of 2.0° C./min, maintaining the temperature at 850° C. for 6 hours, and decreasing the temperature from 850° C. to 25° C. at a rate of 2.0° C./min.

100 parts by weight of the first fired product and 1 part by weight of $Mn_2O_3$ were mixed to obtain a second mixture, and the second mixture was second heat-treated to obtain a positive active material. The second heat-treatment was performed by increasing the temperature from 25° C. to 400° C. at a rate of 2.0° C./min, maintaining the temperature at 400° C. for 6 hours, and decreasing the temperature from 400° C. to 25° C. at a rate of 2.0° C./min.

Example 1-3

Manufacture of Coin Cell

The prepared positive active material, a carbon black carbon conductive agent (Denka Black, Denka Korea Co., Ltd.), and polyvinylidene fluoride (PVdF) were mixed in a weight ratio of 92:4:4, and then mixed with N-methylpyrrolidone (NMP) to prepare a slurry. The slurry was bar-coated on a 15 μm-thick aluminum current collector, dried at room temperature and again at 120° C. under vacuum, and then compressed and punched to manufacture a 45 μm-thick positive electrode plate.

The positive electrode plate was used along with lithium metal as a counter electrode, a PTFE separator, and a solution prepared by dissolving 1.3 M LiPF$_6$ in a mixed solvent of EC (ethylene carbonate), DEC (diethyl carbonate), and EMC (ethylmethyl carbonate) (in a volume ratio of 3:4:3) as an electrolyte to manufacture a coin cell.

Comparative Example 1

A coin cell was manufactured according to substantially the same method as Example 1, except that Mn$_2$O$_3$ was not added to prepare the positive active material.

Comparative Example 2

Comparative Example 2-1

Synthesis of Metal Hydroxide Precursor (Ni$_{0.6}$Co$_{0.2}$Mn$_{0.2}$(OH)$_2$)

The metal hydroxide precursor (Ni$_{0.6}$Co$_{0.2}$Mn$_{0.2}$(OH)$_2$) was synthesized using the co-precipitation method described below. In the following preparing process, nickel sulfate, cobalt sulfate, and manganese sulfate were used as metal-containing raw materials for forming metal hydroxide precursors.

[Single Process: 250 rpm, NH$_3$.H$_2$O 0.50 M, pH 11.4-11.6]

First, ammonia water at a concentration of 0.50 mol/L was added to the reactor. The reactor was set at an agitation power of 250 kW/m$^3$ and a reaction temperature of 50° C., and the metal-containing raw materials were added at a rate of 6.0 mL/min, while the ammonia water was added at a rate of 1.35 mL/min. Subsequently, NaOH was added thereto in order to maintain the pH. Herein, the pH of the reactor was in a range of 11.4 to 11.6. The reaction was maintained within this pH range for 33 hours. A post process was performed by washing the resultant and drying it with hot air at about 150° C. for 24 hours to obtain a metal hydroxide precursor (Ni$_{0.6}$Co$_{0.2}$Mn$_{0.2}$(OH)$_2$).

Comparative Example 2-2

Preparation of Positive Active Material

A positive active material was prepared according to substantially the same method as Example 1-2, except that the metal hydroxide precursor according to Comparative Example 2-1 was used, and Mn$_2$O$_3$ was not added thereto.

Comparative Example 2-3

Manufacture of Coin Cell

A coin cell was manufactured according to substantially the same method as Example 1-3, except that the positive active material according to Comparative Example 2-2 was used.

Comparative Example 3

A coin cell was manufactured according to substantially the same method as Example 1, except that the positive active material was prepared using a metal hydroxide precursor (Ni$_{0.6}$Co$_{0.2}$Mn$_{0.2}$(OH)$_2$) prepared according to substantially the same method as Comparative Example 2-1.

Comparative Example 4

A coin cell was manufactured according to substantially the same method as Example 1, except that the positive active material was prepared using Co$_3$O$_4$ oxide instead of Mn$_2$O$_3$.

Comparative Example 5

A coin cell was manufactured according to substantially the same method as Example 1, except that a positive active material was prepared using manganese (II) acetate tetrahydrate instead of Mn$_2$O$_3$.

Evaluation Example 1

Evaluation of Residual Lithium Content

Unreacted residual lithium present on the surfaces of the positive active materials according to Example 1 and Comparative Examples 1 to 5 were measured using a HCl titration method, and the results are shown in Table 1. In addition, residual lithium reduction rates (%) for Example 1 and Comparative Example 3 were respectively calculated according to Equations 1 and 2, and the results are shown in Table 2.

The unreacted residual lithium contents were measured using the following method. 10 g of a positive active material was put in distilled water and stirred at 300 rpm for 30 minutes, and then an aliquot was taken therefrom, and a pH change thereof was measured while HCl was added thereto. Since the unreacted residual lithium was present as Li$_2$CO$_3$ and LiOH (having a 1:1 ratio of Li$^+$ to CO$_3^{2-}$ and OH$^-$ counter-anions), HCl was added to react with the CO$_3^{2-}$ and OH$^-$ ions to reach a titration point, and the content of unreacted residual lithium could be calculated from the amount of added HCl solution.

TABLE 1

| | Residual lithium content (Li content in Li$_2$CO$_3$ & LiOH/ppm) |
|---|---|
| Example 1 | 954 |
| Comparative Example 1 | 1478 |
| Comparative Example 2 | 904 |
| Comparative Example 3 | 853 |
| Comparative Example 4 | 1330 |
| Comparative Example 5 | 1235 |

TABLE 2

| | Residual lithium content (Li content in Li$_2$CO$_3$ & LiOH/ppm) | Decrease rate of residual lithium (%) |
|---|---|---|
| Example 1 | 954 | 35.5% |
| Comparative Example 3 | 853 | 5.6% |

Decrease rate of residual lithium of Example 1=(residual lithium content of Comparative Example 1−residual lithium content of Example 1)/(residual lithium content of Comparative Example 1)×100%.     Equation 1

Decrease rate of residual lithium of Comparative Example 3=(residual lithium content of Comparative Example 2−residual lithium content of Comparative Example 3)/(residual lithium content of Comparative Example 2)×100%     Equation 2

Comparative Example 1 exhibited a high unreacted residual lithium generation rate during manufacture of the lithium nickel-based composite oxide having a surface orientation (e.g., a high degree of vertical alignment with respect to the outermost surface of the secondary particle, as described above), but Example 1 exhibited a lower unreacted residual lithium content than Comparative Example 1 by reacting the unreacted residual lithium with $Mn_2O_3$ and thus removing the residual lithium.

Comparative Example 2 provided a lithium nickel-based composite oxide having no surface orientation (e.g., no or a relatively low degree of vertical alignment as described above) and thus exhibited a small generation amount of the unreacted residual lithium itself.

Comparative Example 3 reacted the unreacted residual lithium of Comparative Example 2 with $Mn_2O_3$, but an unreacted residual lithium reduction rate (5.6%) of Comparative Example 3 relative to Comparative Example 2 was lower than an unreacted residual lithium reduction rate (35.5%) of Example 1 relative to Comparative Example 1. Without being bound by the correctness of any particular explanation of theory, it is thought that since a small amount of unreacted residual lithium was present on the surface of the lithium nickel-based composite oxide when Comparative Example 2 was used as a parent material, the lithium manganese composite oxide was not effectively formed.

Even though unreacted residual lithium was reacted with a lithium cobalt oxide precursor and a manganese salt (manganese (II) acetate tetrahydrate) in Comparative Examples 4 and 5, respectively, these Comparative Examples showed a high unreacted residual lithium content due to low reactivity with lithium compared with Example 1 using $Mn_2O_3$.

Evaluation Example 2

Transmission Electron Microscopy (TEM), Energy Dispersive X-Ray Spectroscopy (EDS), and Scanning Electron Microscopy (SEM) Analysis A TEM image of the selected area diffraction (SAD) pattern of lithium manganese composite oxide in the positive active material of Example 1 (e.g., Example 1-2: Preparation of Positive Active Material) is shown in FIG. 2, and EDS element analysis results are shown in Table 3 and FIG. 3.

Figure 2:
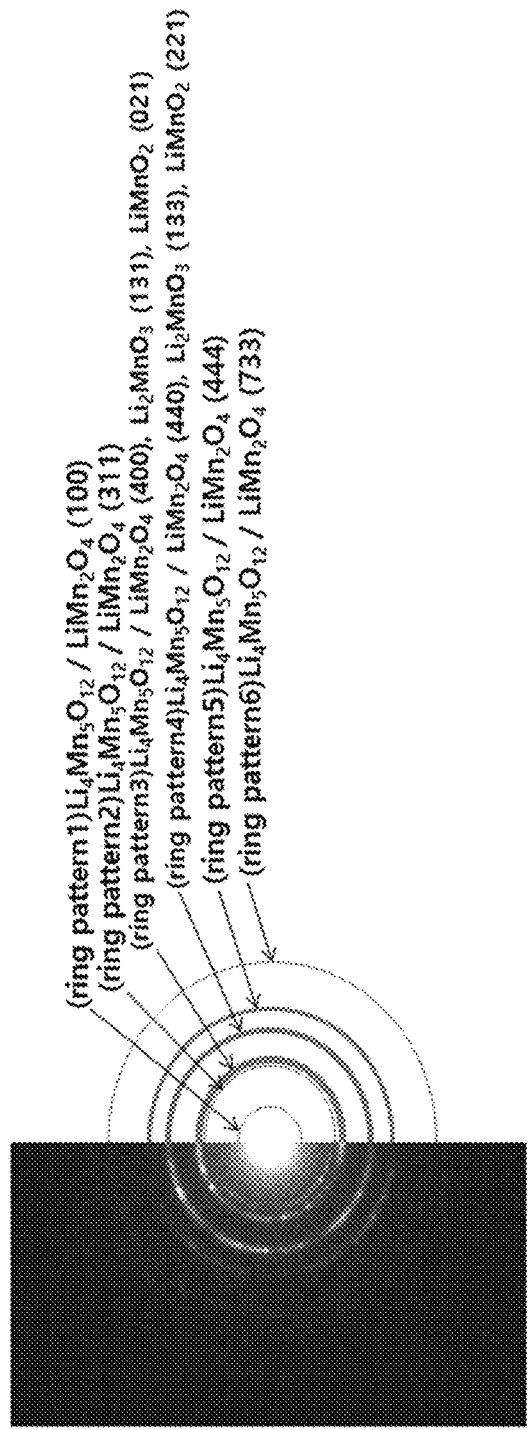
FIG. 2 is a transmission electron microscope (TEM) image of the selected area diffraction (SAD) pattern of the positive active material prepared according to Example 1.
Figure 3:
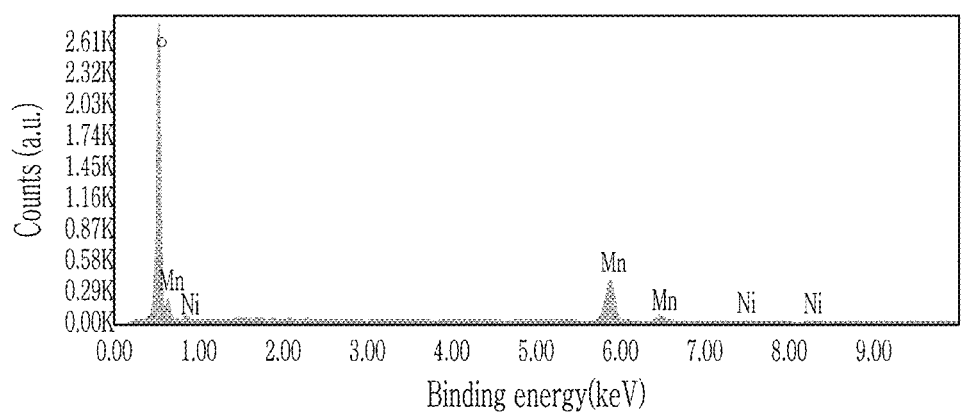
FIG. 3 is a graph showing an energy dispersive X-ray spectroscopy (EDS) analysis of the positive active material prepared according to Example 1.

Referring to the TEM photograph of FIG. 2 and the EDS element analysis results of Table 3 and FIG. 3, the crystal lattice structure of the lithium manganese composite oxide at the surface of the secondary particle may be identified by the interplanar distances in the ring diffraction pattern (e.g., the distance from the center to a ring) as shown in the TEM photograph. In FIG. 2, since ring patterns 1, 2, 5, and 6 corresponding to cubic phases (e.g., $Li_4Mn_5O_{12}$, $LiMn_2O_4$) were found, the lithium manganese composite oxide was found to have or include a cubic crystal lattice structure.

In FIG. 3 and Table 3, the Mn:O atomic mol ratio (mol %) was observed as 25:72, and accordingly, it may be inferred that the compound corresponding to ring patterns 3 and 4 of FIG. 2 is a $Li_2MnO_3$ compound having a matching Mn:O atomic mole ratio of 25:75 to 25:72, and accordingly, the lithium manganese composite oxide should also have or include a monoclinic crystal lattice structure corresponding to e.g., $Li_2MnO_3$.

In addition, the lithium manganese composite oxide may optionally have or include an orthorhombic ($LiMnO_2$) crystal lattice structure included in the ring patterns 3 and 4 in FIG. 2.

TABLE 3

| Elements | Wt % | Atomic mol % |
|---|---|---|
| O | 42.96 | 72.25 |
| Ni | 5.77 | 2.65 |
| Mn | 51.26 | 25.11 |

Figure 4A:
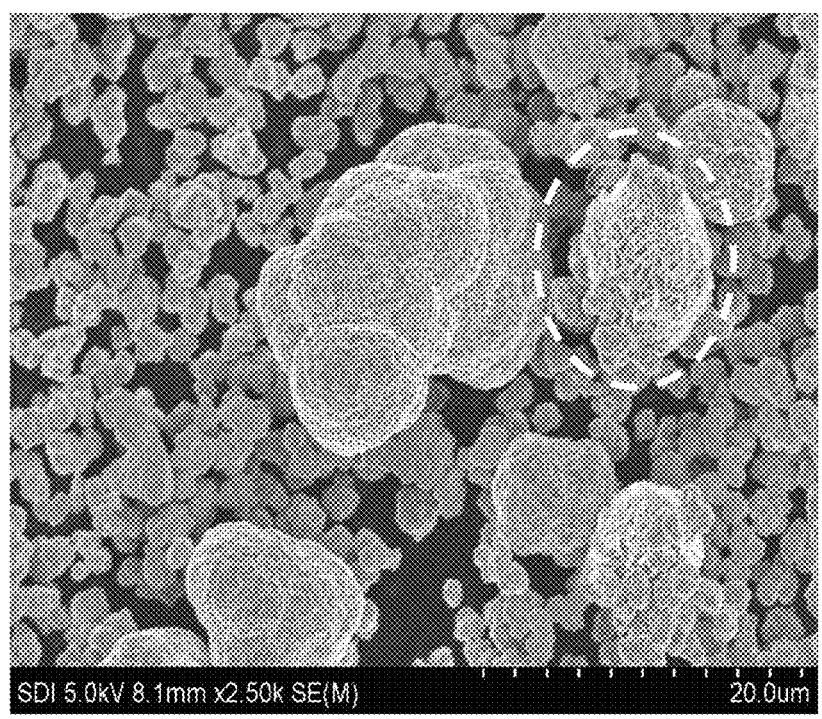
FIG. 4A is a scanning electron microscopy (SEM) image of the material according to Example 1.

FIG. 4A is a scanning electron microscopy (SEM) image of the material according to Example 1. As shown in this image, for example, in the circled secondary particle, the particle has a flower-shaped surface due the presence of lithium manganese composite oxide at the surface of the particle.

Figure 4B:
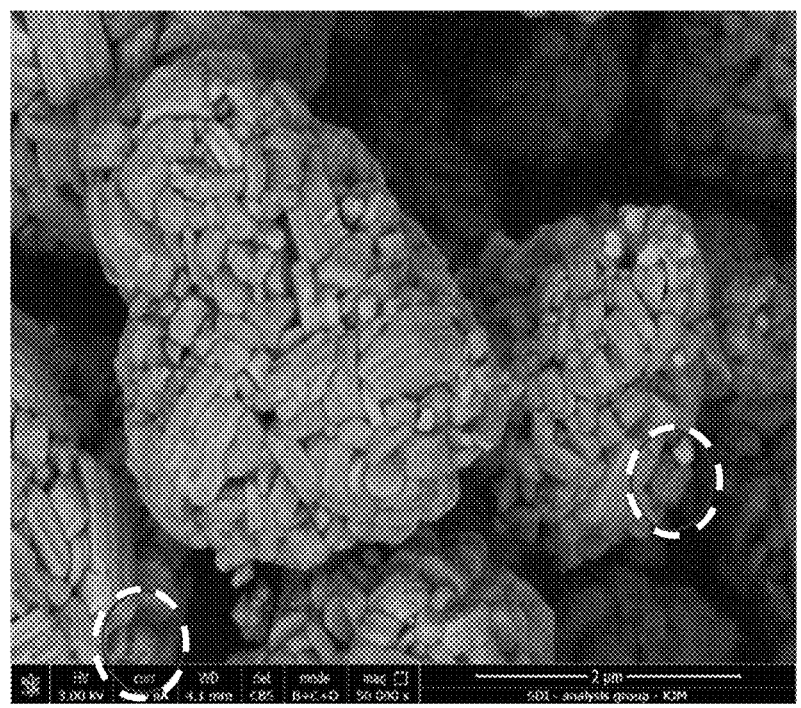
FIG. 4B is a SEM image of an Example material including a slightly smaller lithium manganese composite oxide particle size compared to Example 1.

FIG. 4B is a SEM image of a material prepared in substantially the same manner as Example 1, except for using lithium manganese composite oxide having a comparatively smaller size. Here, the dashed circles indicate particles of the lithium manganese composite oxide. Several regions of the particles have a flower-shaped surface due the presence of lithium manganese composite oxide at the surface of the particles, while several regions of the particles have primary particles that are stacked and aligned without channels therebetween.

Figure 4C:
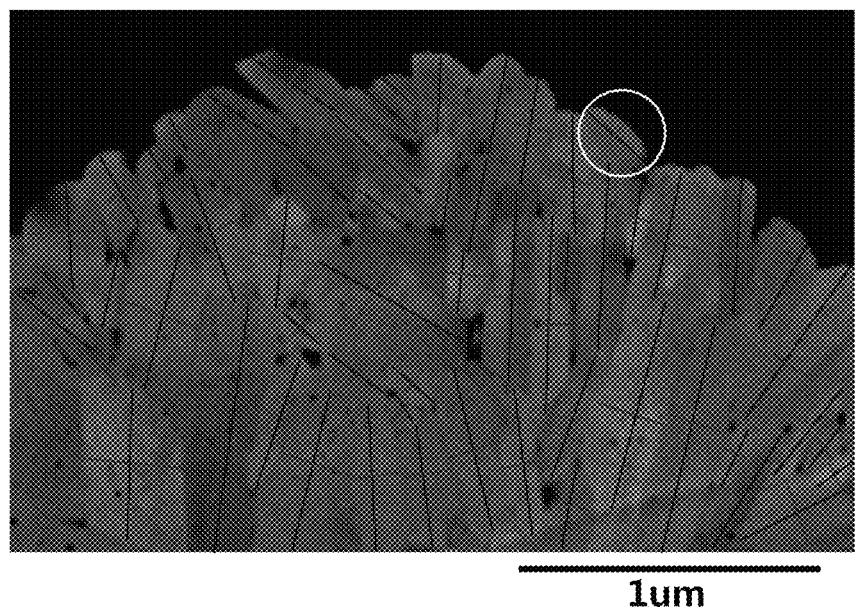
FIG. 4C is a cross-sectional SEM image of the material according to Example 1, showing the radial arrangement of primary particles at the surface of the particle.

FIG. 4C is a cross-sectional SEM image of the material according to Example 1, showing the radial arrangement of lithium nickel-based composite oxide primary particles at the surface of the particle. The crossed lines indicate perpendicular axes of the plate-shaped primary particles. The circled region corresponds to a particle of lithium manganese composite oxide.

Evaluation Example 3

Charge and Discharge Characteristics

The coin cells according to Example 1 and Comparative Examples 1 to 3 were charged under a constant current at 0.1 C up to 4.3 V (vs. Li) at 25° C. and subsequently charged with a cut-off current at 0.05 C, while maintaining the cell at 4.3 V in constant voltage mode. Subsequently, the cells were discharged to a voltage of 3.0 V (vs. Li) under a constant current at 0.1 C (1st cycle). After the 1st cycle, the rechargeable lithium battery cells were charged under a constant current at 0.1 C up to a voltage of 4.3 V (vs. Li) at 25° C., and subsequently charged with a cut-off current at 0.05 C, while maintaining the cell at 4.3 V in constant voltage mode. Subsequently, the cells were discharged to a voltage of 3.0 V (vs. Li) under a constant current at 0.1 C (2nd cycle). After the 2nd cycle, the cells were charged under a constant current at 0.2 C up to a voltage of 4.3 V (vs. Li) at 25° C., and subsequently charged with a cut-off current at 0.05 C, while maintaining the cell at 4.3 V in constant voltage mode. Subsequently, the cells were discharged to 3.0 V (vs. Li) under a constant current at 0.2 C, 0.33 C, 0.5 C, 1.0 C, and 2.0 C (during the 3rd to 7th cycles, respectively). The cells were allowed to rest for 10 minutes after each charge/discharge cycle. The charge and discharge experiment results are shown in Table 4.

TABLE 4

| | 1st cycle charge and discharge efficiency | | | Discharge capacity at each rate (mAh/g) | | | | |
|---|---|---|---|---|---|---|---|---|
| | Charge capacity (mAh/g) | Discharge capacity (mAh/g) | Efficiency (%) | 0.2 C | 0.33 C | 0.5 C | 1 C | 2 C |
| Example 1 | 196.5 | 188.1 | 95.7% | 185.2 | 182.3 | 179.9 | 174.3 | 167.4 |
| Comparative Example 1 | 197.1 | 185.9 | 94.3% | 183.1 | 180.3 | 178.2 | 172.7 | 166.1 |
| Comparative Example 2 | 196.9 | 176.2 | 89.5% | 173.0 | 170.1 | 167.4 | 162.3 | 156.3 |
| Comparative Example 3 | 196.7 | 176.1 | 89.5% | 172.9 | 170.0 | 167.3 | 162.3 | 156.3 |

As shown in Table 4, the coin cell according to Example 1 exhibited improved charge and discharge efficiency characteristics and discharge capacities at each rate compared with the coin cells according to Comparative Examples 2 and 3, which do not include lithium nickel oxide having a surface orientation (e.g., lithium nickel oxide having a high degree of vertical alignment with respect to the outermost surface of the secondary particle). For example, since a lithium manganese composite oxide was not effectively formed in Comparative Example 3, Comparative Example 3 had similar characteristics to Comparative Example 2. In addition, compared with Comparative Example 1 having the above-described surface orientation but including no lithium manganese composite oxide, the coin cell of Example 1 exhibited improved discharge capacity, efficiency, and high rate characteristics due to formation of a lithium manganese composite oxide and removal of unreacted lithium.

Evaluation Example 4

Evaluation of High Temperature Cycle-Life Characteristics

The coin cells according to Comparative Examples 1 and 2 and Example 1 after the 1st cycle in Evaluation Example 3 were charged under a constant current at 1.0 C up to a voltage of 4.30 V (vs. Li) at 45° C., and subsequently charged with a cut-off current at 0.05 C while maintaining a voltage of 4.30 V in constant voltage mode. Subsequently, the cells were discharged under a constant current at 1.0 C down to a voltage of 3.0 V (vs. Li), and this charge/discharge cycle was repeated 50 times. The cell was allowed to rest for 10 minutes after each charge/discharge cycle. The charge and discharge experiment results and the capacity retention at the 50th cycle are shown in Table 5.

The capacity retention at the 50th cycle was defined according to Equation 3.

Capacity retention at 50th cycle=[Discharge capacity at 50th cycle at 45° C./Discharge capacity at 1st cycle at 45° C.]×100%    Equation 3

TABLE 5

| | Discharge capacity at 1st cycle at 45° C. (mAh/g) | Discharge capacity at 50th cycle at 45° C. (mAh/g) | Capacity retention at 50th cycle (%) |
|---|---|---|---|
| Example 1 | 186.8 | 183.0 | 98.0 |
| Comparative Example 1 | 184.2 | 178.6 | 97.0 |
| Comparative Example 2 | 175.1 | 163.2 | 93.2 |

The coin cell of Example 1 having the agglomerated plate-shaped primary particles and lithium manganese composite oxide according to embodiments of the present disclosure exhibited excellent cycle-life characteristics by effectively removing unreacted residual lithium on the surface. In contrast, the coin cell of Comparative Example 1, which did not include the lithium manganese composite oxide, and the coin cell of Comparative Example 2, which did not include the agglomerated plate-shaped primary particles or lithium manganese composite oxide, showed significantly (comparatively) lower charge and discharge capacities and capacity retention rates.

Evaluation Example 5

Evaluation of High Temperature Gas Generation Amount

Figure 6:
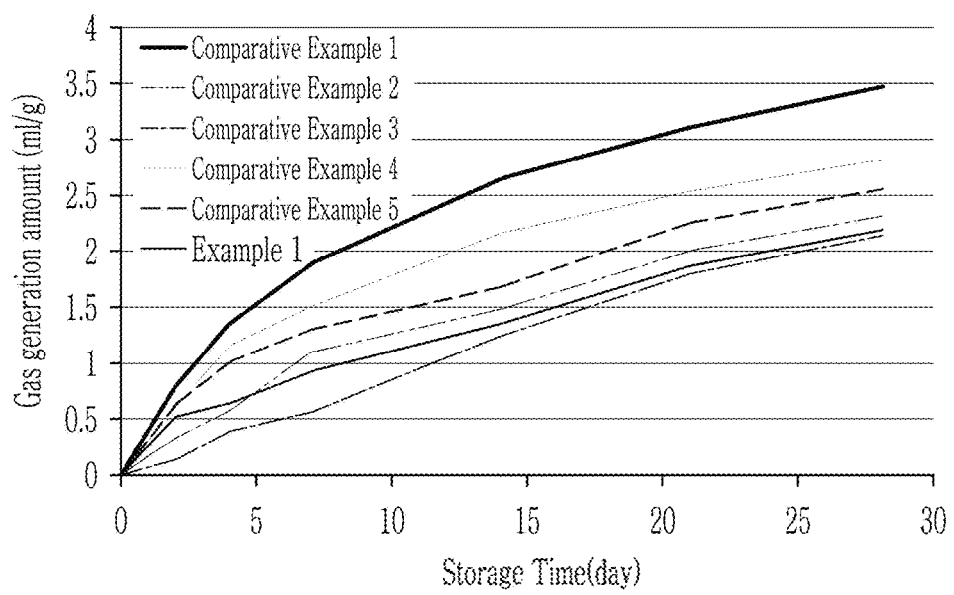
FIG. 6 is a graph of cumulative gas generation amounts over time during storage at high temperature of the positive electrodes of the coin cells manufactured according to Example 1 and Comparative Examples 1 to 5.

The coin cells according to Example 1 and Comparative Example 1 to 5 were charged under a constant current at 0.1 C up to a voltage of 4.3 V (vs. Li), and subsequently charged with a cut-off current at 0.05 C, while maintaining the cell at 4.3 V in constant voltage mode at 25° C. Subsequently, the cells were discharged to a voltage of 3.0 V (vs. Li) under a constant current at 0.1 C, thus completing the 1st cycle. In the 2nd cycle, the lithium battery cells were charged under a constant current up to 4.3 V (vs. Li) at 0.1 C at 25° C., and subsequently charged with a cut-off current of 0.05 C, while maintaining the cell at 4.3 V in constant voltage mode. The cell was then disassembled, the electrode plates taken therefrom were each inserted into a pouch filled with an electrolyte solution and stored in an 80° C. oven, the volume change of each pouch was converted into a mass using an Archimedes (e.g., volume displacement) method, and the results are shown in FIG. 6. Meanwhile, the electrolyte was prepared by dissolving 1.3 M $LiPF_6$ in a mixed solvent of EC (ethylene carbonate), DEC (diethyl carbonate), and EMC (ethylmethyl carbonate) (in a volume ratio of 3:4:3).

Example 1 and Comparative Examples 2 and 3 exhibited decreased gas generation amounts compared with Comparative Examples 1, 4, and 5. Further, Example 1 exhibited a very highly decreased gas generation rate compared with Comparative Example 1. As a result, Example 1 showed that a gas generation amount and a gas generation reduction rate were improved compared with Comparative Examples 1, 2, 4, and 5.

As used herein, the terms "use", "using", and "used" may be considered synonymous with the terms "utilize", "utilizing", and "utilized", respectively. Further, the use of "may"

when describing embodiments of the present disclosure refers to "one or more embodiments of the present disclosure".

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims and equivalents thereof.

DESCRIPTION OF SOME OF THE SYMBOLS

| 10: primary particle | |
| 20: secondary particle | 22: core |
| 24: shell | 26: intermediate layer |
| 31: rechargeable lithium battery | 32: negative electrode |
| 33: positive electrode | 34: separator |
| 35: battery case | 36: cap assembly |

What is claimed is:

1. A positive active material for a rechargeable lithium battery, comprising:
a lithium nickel-based composite oxide comprising a secondary particle in which a plurality of plate-shaped primary particles are agglomerated; and
a lithium manganese composite oxide on the outermost surface of the lithium nickel-based composite oxide and having at least two crystal lattice structures,
wherein the secondary particle has a regular array structure in which (003) planes of the primary particles are oriented in a vertical direction with respect to an outermost surface of the secondary particle.

2. The positive active material of claim 1, wherein an amount of the lithium manganese composite oxide is about 0.1 wt % to about 5 wt % based on a total weight of the positive active material.

3. The positive active material of claim 1, wherein the lithium manganese composite oxide has an average particle diameter of less than or equal to about 10 µm.

4. The positive active material of claim 1, wherein the lithium manganese composite oxide is represented by Chemical Formula 1:

$x\text{LiMnO}_2 \cdot y\text{Li}_4\text{Mn}_5\text{O}_{12} \cdot z\text{LiMn}_2\text{O}_4 \cdot$
$(1-x-y-z)\text{Li}_2\text{MnO}_3$  Chemical Formula 1

($0 \leq x < 1$, $0 \leq y < 1$, $0 \leq z < 1$, $0 < y+z < 1$, and $0 < x+y+z < 1$).

5. The positive active material of claim 1, wherein the lithium manganese composite oxide comprises a cubic crystal lattice structure and a monoclinic crystal lattice structure, and optionally an orthorhombic crystal lattice structure.

6. The positive active material of claim 5, wherein:
the cubic crystal lattice structure corresponds to at least one selected from $\text{LiMn}_2\text{O}_4$ and $\text{Li}_4\text{Mn}_5\text{O}_{12}$,
the monoclinic crystal lattice structure corresponds to $\text{Li}_2\text{MnO}_3$, and
the orthorhombic crystal lattice structure corresponds to $\text{LiMnO}_2$.

7. The positive active material of claim 1, wherein the lithium nickel-based composite oxide has a porosity of about 1% to about 8%.

8. The positive active material of claim 1, wherein the lithium nickel-based composite oxide has a specific surface area of about 0.3 m$^2$/g to about 0.8 m$^2$/g.

9. The positive active material of claim 1, wherein the secondary particle is in a single-centered radial arrangement structure having one center or a multi-centered radial arrangement structure having a plurality of centers.

10. The positive active material of claim 1, wherein an unreacted residual lithium content on the outermost surface of the positive active material is less than or equal to about 1,300 ppm.

11. The positive active material of claim 10, wherein the unreacted residual lithium content on the outermost surface of the positive active material is less than or equal to about 1,000 ppm.

12. A rechargeable lithium battery comprising:
a positive electrode comprising the positive active material of claim 1;
a negative electrode comprising a negative active material; and
an electrolyte between the positive electrode and the negative electrode.

13. A method of preparing a positive active material for a rechargeable lithium battery, the method comprising:
mixing a metal hydroxide precursor and a lithium source to prepare a first mixture;
first heat-treating the first mixture at about 750° C. to about 950° C. to prepare a first fired product comprising residual lithium;
mixing the first fired product with a manganese-based oxide to prepare a second mixture; and
second heat-treating the second mixture,
wherein the positive active material comprises:
a lithium nickel-based composite oxide comprising a secondary particle in which a plurality of plate-shaped primary particles are agglomerated; and
a lithium manganese composite oxide having at least two crystal lattice structures,
wherein the secondary particle has a regular array structure in which (003) planes of the primary particles are oriented in a vertical direction with respect to an outermost surface of the secondary particle.

14. The method of claim 13, wherein the manganese-based oxide is mixed in an amount of about 0.1 to about 5 parts by weight based on 100 parts by weight of the first fired product.

15. The method of claim 13, wherein the second mixture further comprises a second lithium source.

* * * * *